(12) United States Patent
Strässle et al.

(10) Patent No.: US 6,792,732 B2
(45) Date of Patent: Sep. 21, 2004

(54) CUBE-SHAPED PROFILE ELEMENT AND PROFILE STRIP THEREFOR

(75) Inventors: Marcel Strässle, Kirchberg (CH); Kurt Züllig, Kirchberg (CH)

(73) Assignee: Syma Intercontinental AG (CH)

( * ) Notice: Subject to any disclaimer, the term of this patent is extended or adjusted under 35 U.S.C. 154(b) by 0 days.

(21) Appl. No.: 10/169,595

(22) PCT Filed: Jan. 5, 2001

(86) PCT No.: PCT/CH01/00006
§ 371 (c)(1),
(2), (4) Date: Jul. 5, 2002

(87) PCT Pub. No.: WO01/49950
PCT Pub. Date: Jul. 12, 2001

(65) Prior Publication Data
US 2002/0189191 A1 Dec. 19, 2002

(30) Foreign Application Priority Data
Jan. 5, 2000 (CH) .............................................. 0020/00

(51) Int. Cl.⁷ .............................. E04B 1/38; F16B 7/00
(52) U.S. Cl. ..................... 52/655.1; 52/653.2; 403/171; 403/217; 403/292
(58) Field of Search .......................... 52/655.1, 655.2, 52/653.1, 653.2, 126.3–126.7, 731.5, 731.9; 403/171, 217, 292; 446/124, 126

(56) References Cited
U.S. PATENT DOCUMENTS

| | | | |
|---|---|---|---|
| 3,069,805 A | * | 12/1962 | Burrows |
| 4,271,654 A | * | 6/1981 | Jungbluth |
| 4,922,669 A | * | 5/1990 | De Pas et al. ................ 52/646 |
| 4,925,330 A | * | 5/1990 | Cornish |
| 5,048,242 A | * | 9/1991 | Cline |
| 5,051,019 A | | 9/1991 | Kohl |
| 5,580,181 A | * | 12/1996 | Monura |
| 5,678,375 A | * | 10/1997 | Juola |
| 5,680,737 A | * | 10/1997 | Sheipline |
| 5,803,782 A | | 9/1998 | Selton |
| 5,839,248 A | * | 11/1998 | Liang ........................ 52/655.2 |

FOREIGN PATENT DOCUMENTS

| | | |
|---|---|---|
| DE | 36 20 379 A | 12/1987 |
| DE | 195 09 398 A1 | 9/1996 |
| DE | 298 23 124 U | 3/1999 |
| EP | 0 361 039 A | 4/1990 |
| FR | 2590943 * | 6/1987 |
| HU | 210 542 B | 5/1995 |
| HU | 217 900 B | 5/2000 |
| WO | WO 97/25536 | 7/1997 |
| WO | WO 97 41319 A | 11/1997 |

* cited by examiner

Primary Examiner—Robert Canfield
(74) Attorney, Agent, or Firm—Webb Ziesenheim Logsdon Orkin & Hanson, P.C.

(57) ABSTRACT

The invention relates to a cube-shaped profile element provided with more than six identical side surfaces, wherein preferably eight slots are arranged at an angle of 45 degrees to each other around an axis of symmetry of the side surface and wherein a central boring is provided. Through the slots behind the side surface, insertable closing elements can be inserted through the slots behind the side surface. The profile element is preferably hollow and is constructed from six identical plates that form side surfaces. All the plates are provided with eight-cornered edges, whereby the plates are connected via one edge and the other edges each form an opening at the corners of the cube-shaped profile elements. Very modular, stable construction systems are produced using these elements and cross-shaped profile strips having an acceptable appearance when connected with clamp profiles, wherein these elements each form an optically acceptable closure at the edges of the skeleton structure.

6 Claims, 5 Drawing Sheets

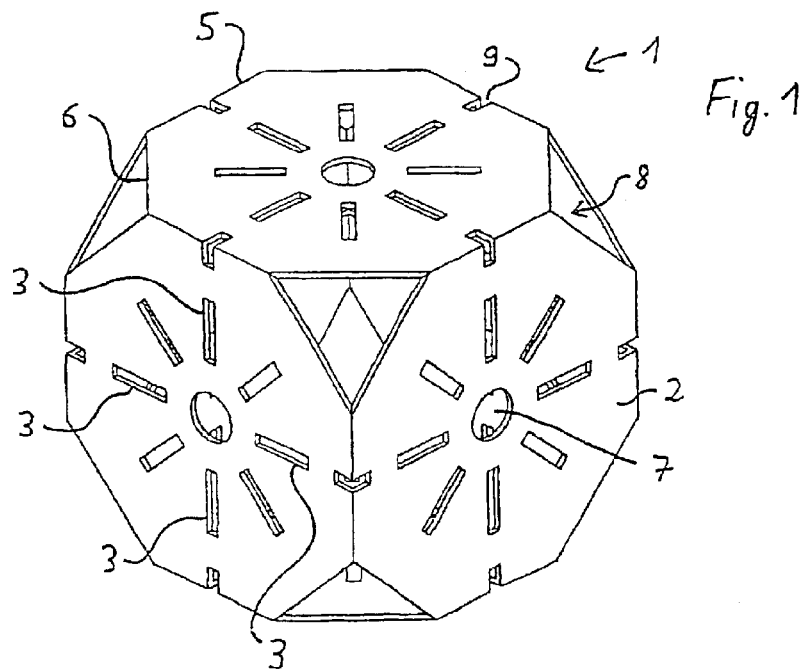
Fig. 1
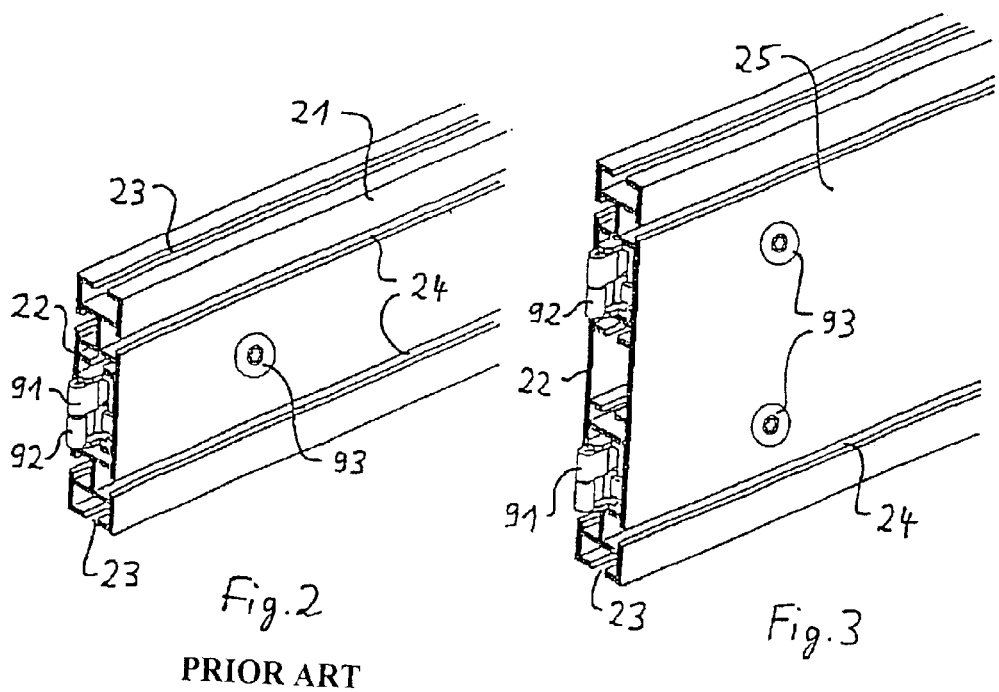
Fig. 2 PRIOR ART
Fig. 3

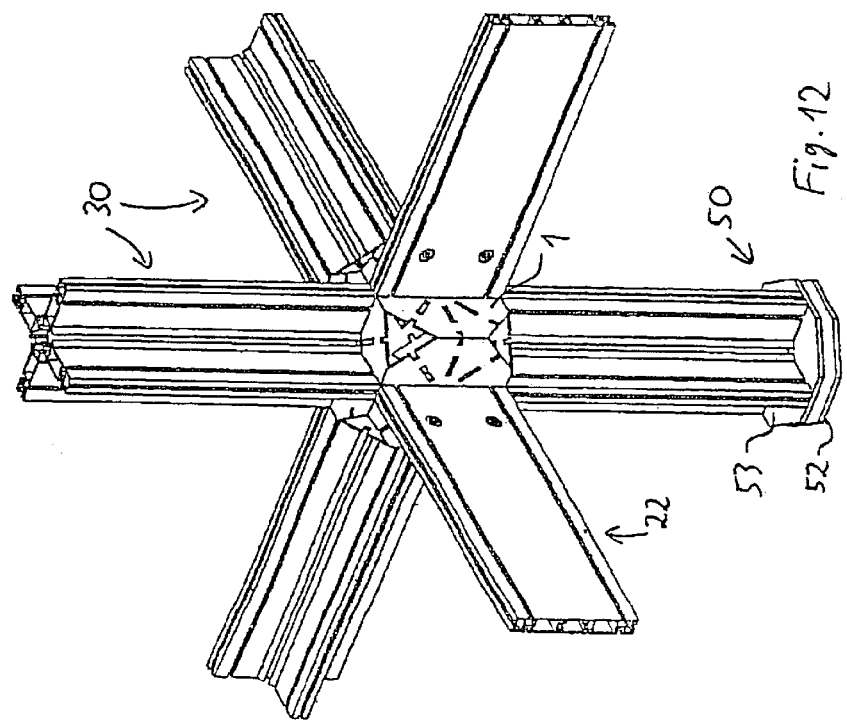
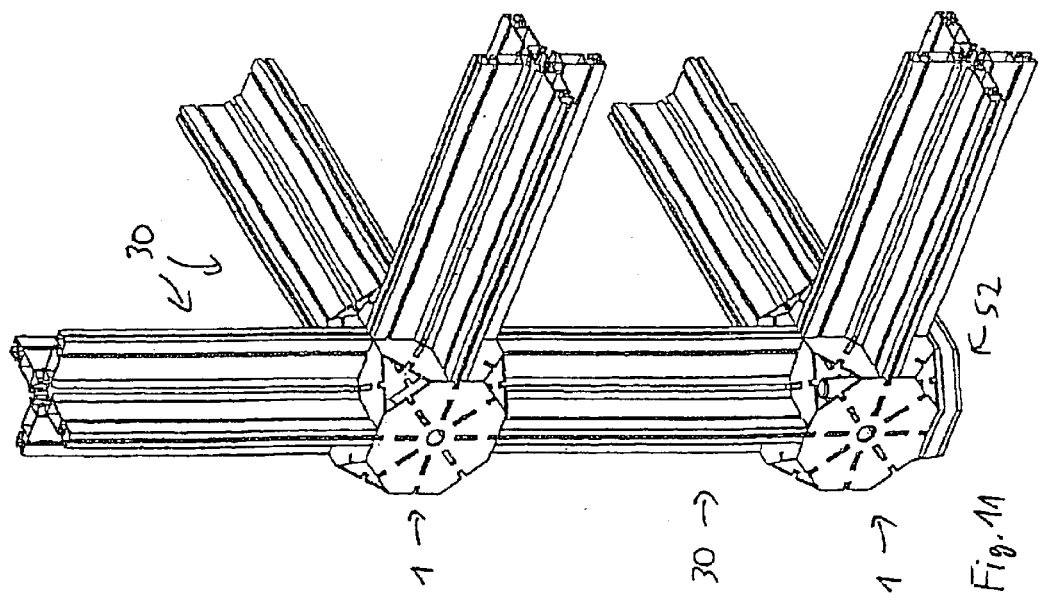

CUBE-SHAPED PROFILE ELEMENT AND PROFILE STRIP THEREFOR

BACKGROUND OF THE INVENTION

1. Field of the Invention

This invention relates to a cube-shaped profile element that has six identical side surfaces.

2. Description of the Related Art

The prior art includes various profile elements that can be used for the construction of exhibit stands, for example, according to the modular principle. However, a large number of different components are required to satisfy all the desired design requirements for such structures. Moreover, the high-tech appearance of many elements must also be taken into consideration, and in and of themselves they do not always have an appearance that is pleasing to an observer.

On the basis of this prior art, the object of the invention is to indicate construction elements that are better suited to combine modularity, strength and the related stability of structures with an appropriate aesthetic appearance.

SUMMARY OF THE INVENTION

This invention teaches that on a cube-shaped profile element, there are at least two slots provided in said element which are diametrically opposite each other with reference to the axis of symmetry of the side surface, through which interlocking or closing elements can be introduced that can be engaged behind the side surface by means of hooks.

The profile element is preferably hollow and consists of six identical plates that form the side surfaces. In one preferred embodiment of the invention, each plate is octangular with edges, whereby only some of the edges of each plate abut the neighboring plate and the other edges each form an opening at the corners of the cube-shaped profile element.

A profile strip for use with a cube-shaped profile element is characterized by the fact that the profile strip is cross shaped and has on its ends four cavities that are symmetrical to the longitudinal axis of the profile strip, are located in the ends of the cross and receive closing or interlocking elements, by means of which the profile strip can be connected with the cube-shaped profile element through the slots in the cube-shaped profile element.

Additional advantageous embodiments of the invention are described in the subclaims.

BRIEF DESCRIPTION OF THE DRAWINGS

The invention is explained in greater detail below with reference to the enclosed drawings which illustrate exemplary embodiments of the invention, and in which:

FIG. 1 shows a cube-shaped profile element or node,

FIG. 2 shows a first profile strip with an inserted interconnecting element for connection with a node as illustrated in FIG. 1, FIG. 3 shows an additional profile strip with an inserted interconnecting element for connection with a node as illustrated in FIG. 1.

FIG. 11 is a view of a portion of a three-dimensional structure with two illustrated nodes, and FIG. 12 is a view of a portion of a three-dimensional structure with an upright that has an illustrated node.

DETAILED DESCRIPTION OF THE PREFERRED EMBODIMENTS

Figure 8:
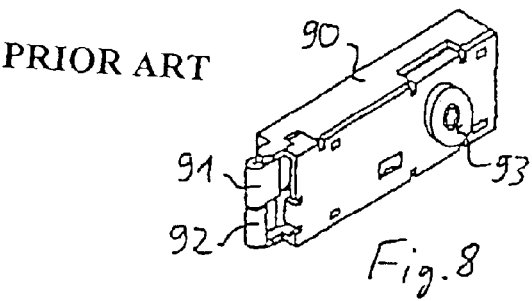
FIG. 8 shows an interconnecting element for the connection of a node as illustrated in FIG. 1 with a profile strip as illustrated in FIG. 2 or FIG. 3.

FIG. 1 shows a cube-shaped profile element which is designated a "node" below and is identified with the reference number 1. In the exemplary embodiment illustrated, the node 1 is hollow and consists of six parallel side surfaces 2 that are respectively parallel to each other, each of which is constructed identically and which are illustrated in further detail in FIG. 1. The essential feature is the presence of at least two slots that are oriented centrically symmetrically to each other, of which there are advantageously four, which are identified by the reference number 3. The slots 3 are designed to receive the clamping hooks 91, 92 of interconnecting element 90 as illustrated in FIG. 8.

For particularly varied use of the nodes 1, an additional four slots 4 can be provided, each of which is at an angle of 45° to the slots 3.

Figure 5:
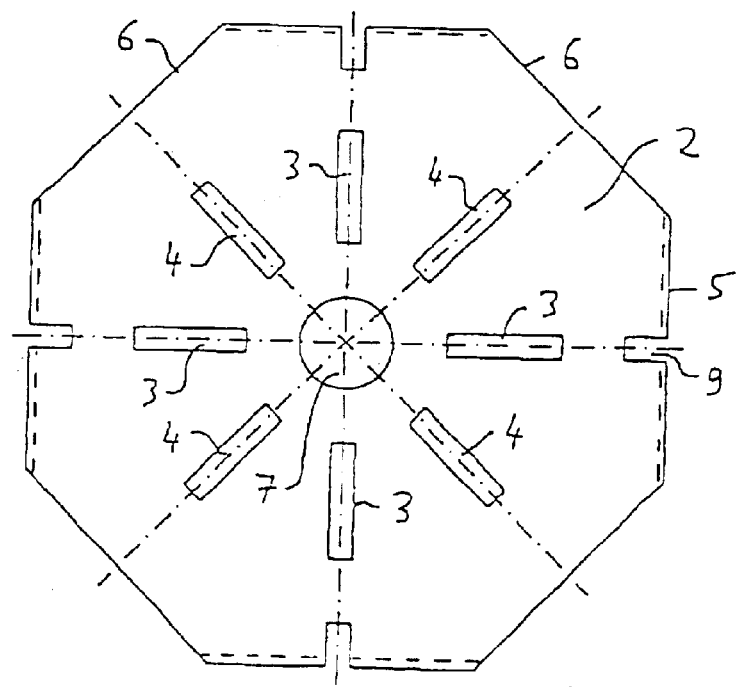
FIG. 5 shows a side surface of a node as illustrated in FIG. 1, in a plan view from overhead.
Figure 9:
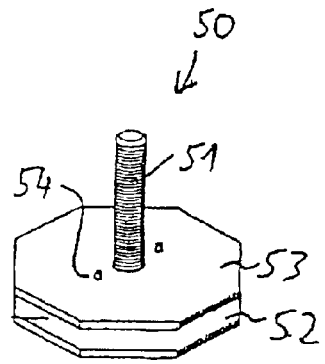
FIG. 9 shows a foot for the connection with a node as illustrated in FIG. 1 for erection on a floor.

The node 1 consists, as described above, of six identical surfaces 2, which are connected on each of their four edges 5 with a neighboring cube-shaped surface. The edges 5 do not occupy the entire width of the surfaces 2, which can be 120 millimeters, for example. FIG. 5 shows clearly that the surface 2 in this exemplary embodiment is an octagon, and therefore has four corner edges 6. The dotted line behind the edge 5 indicates that the edge 5 does not form a surface perpendicular to the surface of the plate 2, but is undercut, so that two plates 2 can be connected to each other symmetrically at a right angle to one another. This connection can be a welded connection, for example, or a brazed connection. In the center of each surface 2 there is a boring 7, which is designed in particular to receive a threaded rod 51 of a foot 50 as illustrated in FIG. 9. Instead of the hollow node 1, a solid material element with appropriate cavities and undercuts could also be used.

As a result of the surfaces 2, which are octagonal in the exemplary embodiment illustrated, openings are formed in the node 1 which are bordered by a triangle, the edges of which are formed from the edges 6 of the surfaces 2. In addition, the surfaces 2, in the vicinity of their edges 5, also have a groove 9, which is located laterally between two surfaces 2.

FIG. 2 shows a profile strip 21 of the prior art with an inserted interlocking element 90, the actuator knob 93 of which projects laterally from a corresponding boring. For fastening, the profile strip 21 is placed with its one end 22 laterally on a surface 2 of a node 1 so that the clamping hooks 91 and 92 are engaged in a slot 3 or 4. By tightening the actuator knob 93, as explained further with reference to FIG. 8, the clamping hooks 91 and 92 extend behind the slot 3 or 4 and detachably but firmly connect the profile strip 21 with the node 1. Instead of an interlock element 90, any other closing or interlock element can also be used in which hooks extend behind a boring or slot on one or both sides. The configuration of the profile strip 21 can also be any required shape. It is advantageous, of course, if two grooves 23 for wall elements are provided parallel to the main plane of the profile strip 21 and grooves 24 for wall elements are provided perpendicular to the main plane of the profile strip 21, although here, too, other configurations can be provided, and the width of the profile strip 21 can be also selected as required. In this case, for example, it is advantageous to choose a width that is one-half the diameter of the node 1.

FIG. 3 shows another configuration of a profile strip 25 in which there are two cavities to receive two interlocking elements 90. As in all the figures of this patent application, identical features are identified by the same reference numbers. In this case, for fastening, the profile strip 25 is placed with its one end 22 centrically symmetrically on a surface 2 of a node 1 so that the clamping hooks 91 and 92 of each interlocking element 90 are engaged in a respective slot 3 or 4, which are opposite each other centrically symmetrically to the boring 7. As a result of this symmetrical interlock, significant forces and moments can be transmitted.

Figure 4:
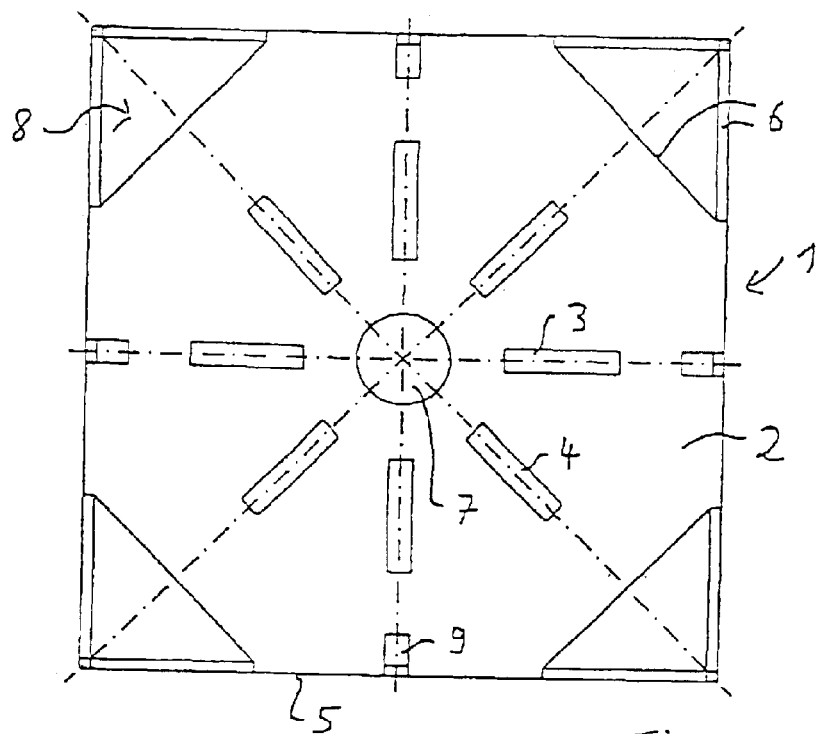
FIG. 4 shows a plan view from overhead of a node as illustrated in FIG. 1.

FIG. 4 shows a plan view from overhead of a node 1 and in particular a surface 2. It is clear from the cubic external shape of the node 1 in the plan view that the node has a cube shape which is cut off only on the corners by the openings 8. The slots 3 and 4 are at an angle of 45 degrees in relation to each other and are otherwise identical in their dimensions. The length and width are determined as a function of the hooks 91 and 92 and their shape and can be modified to meet requirements so that they can be used with other interlocking elements 90. The distance of each slot 3 and 4 from the center of the surface 2 is determined by the dimension of the profile strip 21 or 25 or other profile strips that can be used.

FIG. 5 shows a surface 2 in isolation. The node 1 can be made of metal, for example, in particular stainless steel, and can have a thickness of 1 to 5 millimeters, for example, With the latter thickness, it is then possible to construct load-bearing skeleton structures for a two-story structure, for example for an exhibit stand.

Figure 6:
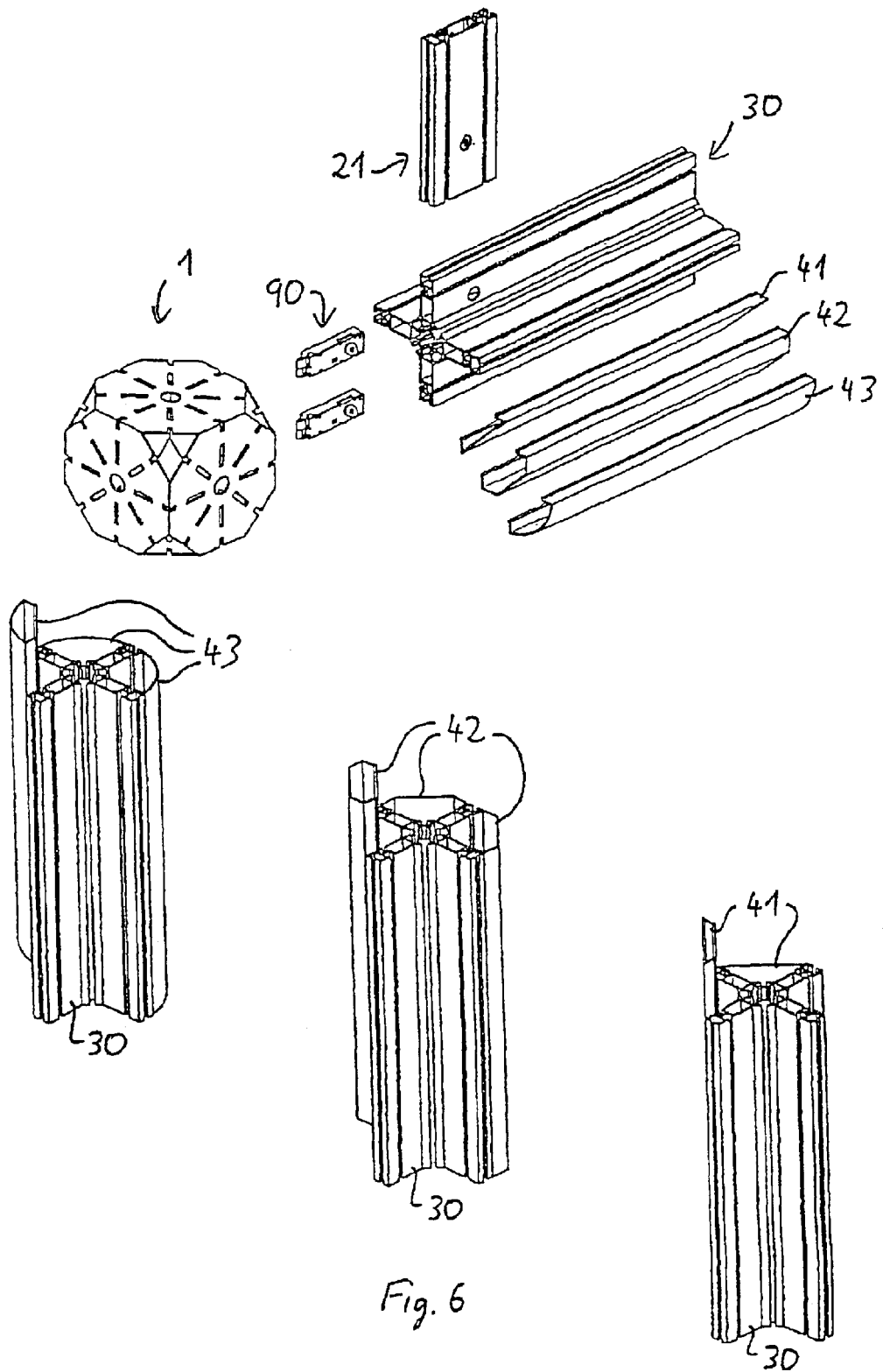
FIG. 6 is an exploded view of various profile elements that can be combined with the node illustrated in FIG. 1.

FIG. 6 shows an exploded view of various profile elements that can be combined with the node 1. In particular, a novel cross-shaped profile strip 30 is illustrated, which is explained in greater detail below with reference to FIGS. 7 and 10. The interlocking elements 90 are inserted in corresponding receptacles of the profile strip 30. In the exemplary embodiment illustrated, two opposite slots 3 are occupied by the hooks of the interlocking elements 90. However, all four receptacles in the cross-shaped profile strip 30 can also be occupied by interlocking elements 90 so that the cross-shaped profile strip 30 is connected with the node 1 by means of all four slots 3 of the node 1, which results in excellent stability.

In an application that is not illustrated in the drawings, the cross-shaped profile strips 30 can also be inserted at an angle of 45 degrees with respect to the node and then the two or four interlocking elements are engaged in two or four slots 4 of the node 1.

Figure 10:
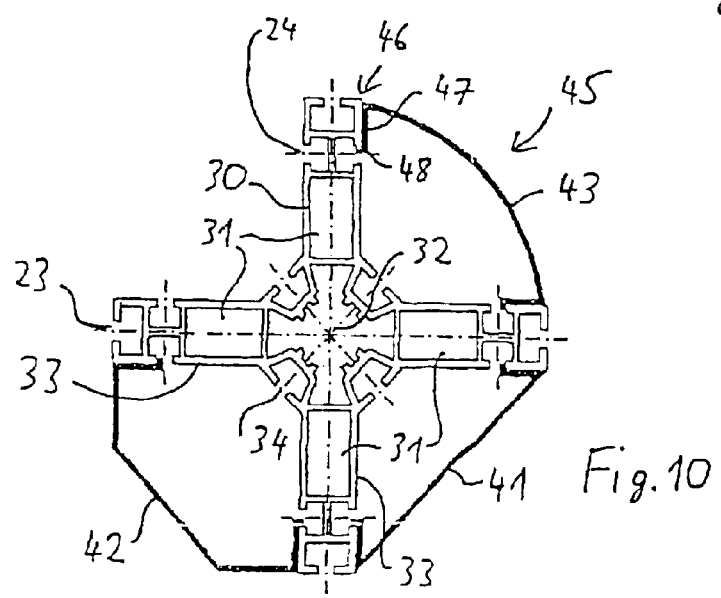
FIG. 10 shows an additional profile strip with a clamp profile as illustrated in FIG. 6 in an enlarged plan view from overhead.

The invention also relates to clamp profiles 41, 42 and 43 which are illustrated on an enlarged scale in FIG. 10. In the bottom three illustrations of an additional profile strip 30, it is clearly apparent that with the clamp profiles 41, 42 and 43, the outer edges of the cross-shaped profile strip 30 can be covered and thus make possible a column structure. Additionally, however, the grooves provided in the cross-shaped profile strip 30 can be used to hold wall elements or also to hold additional profile strips, which in this case are designated 21.

Figure 7:
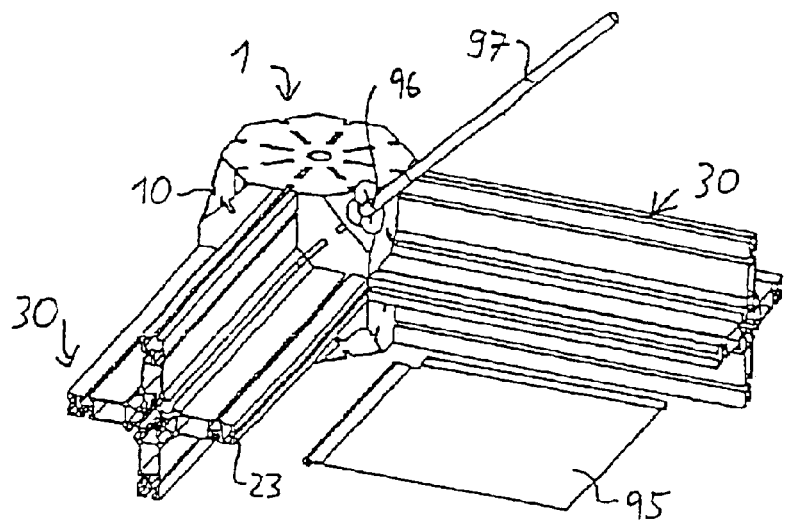
FIG. 7 shows additional potential uses for the node illustrated in FIG. 1.

FIG. 7 shows additional potential applications for the node 1. Fastened to two neighboring surfaces 2 are two additional profile strips 30. Then a bracing surface 95 can be introduced into their end grooves 23, which makes possible a cover in a very lightweight realization. The openings 8 also make it possible to fasten a holding element 96, to which a bracing rod or a bracing cable 97 can then be fastened. In the node 1 illustrated in FIG. 7, there is a central groove 10 provided on each of the lateral edges 6.

FIG. 8 shows an interlocking element 90 of the prior art, of the type described by the applicant in WO97/25536, for example. This realization is mentioned only by way of example and is an interlocking element that is particularly well suited for the connection of nodes 1 and profile strips 21, 22 or 30. However, other interlocking elements can also be used.

FIG. 9 shows a foot 50 for connection with a node 1 as illustrated in FIG. 1 for erection on a floor. The foot 50 thereby consists of a base plate 52, to which a threaded rod 51 is fastened centrally. For aesthetic reasons, the base plate 52 is preferably an octagon like the base surface of the node 1. Screwed onto the threaded rod 51 is an arresting plate 53, which is preferably also octagonal. This arresting plate 53 has a boring which comprises a thread to receive the threaded rod 51. It is advantageous if one or more elevations 54 are also provided on the arresting plate 53 and are located so that they can be mounted in the slots 3 or 4. Thus a node 1 with the boring 7 can be placed on the threaded rod and locked on the arresting plate 53. By rotating the base plate 52 with respect to the arresting plate 53, the distance between the arresting plate and the base plate 52 can be varied, and thus the node 1 sitting on this arresting plate 5 can be raised or lowered, thereby achieving a leveling capability. Instead of a female thread on the arresting plate 53 or instead of the arresting plate 53 itself, a nut can also be provided to adjust the height of the node sitting on said arresting plate.

FIG. 10 shows an additional profile strip 30 with clamp profiles 41, 42 and 43 as illustrated in FIG. 6 in a plan view from overhead. The profile strip 30 is a preferred realization with four cavities 31 to receive interlocking elements 90. Preferably, two cavities opposite each other or all four cavities are used. The grooves 23 and 24 correspond to the grooves in the profile strips 21 and 22 in FIGS. 2 and 3 respectively. It is clearly apparent that the clamp profiles 41, 42 and 43 have a center part 45 that corresponds to the shape and surface color, and is of a color that is aesthetically acceptable to an observer and makes a transition on its lateral edges 46 into a support segment 47 that rests on the profile strip 30 with a hook segment 48 that is engaged in the groove 24. The height of the support segment 47 is thereby selected so that the side edge 46 starts transversely flush from the groove opening and the hook is engaged in the edge of the groove 24 farther from the center.

In an exemplary embodiment that is not illustrated in the drawing, a reinforcing rod can be inserted in the center, and can run for example through the opening 7 in the surface 2, where it can be fastened.

Preferably the reinforcing rod is then screwed tight in a thread in the center 32. It is advantageous if there is an additional groove 34 at a 45 degree angle between two arms 33 of the cross-shaped profile strip 30. This groove can be covered by the clamp profiles 41, 42 or 43 or can be occupied directly by a strip, e.g. 21, or a wall surface, e.g. 95.

FIG. 11 shows a partial view of a three-dimensional structure with two nodes 1 as illustrated. The lower node 1 sits directly on the foot 50. As a corner element, two profile strips 30 start at an angle of 90 degrees, and there is a profile strip 30 that projects perpendicularly. At a specified height there is an additional node 1, from which additional profile strips 30 depart at the same angles. Wall elements can be inserted between individual profile strips 30. The distances of the nodes 1 from one another or the number of the nodes can be determined in accordance with the desired appearance and static strength required of the skeleton structure.

Finally, FIG. 12 shows a partial view of a three-dimensional structure with an upright that has one illustrated node. In this case, a profile strip 30 rests on the upper plate 53 of the foot 50. Fastened to the node 1 are three additional cross-shaped profile strips 30 and two profile strips 22 as illustrated in FIG. 3.

With these elements, the nodes 1 and the cross-shaped profile strips 30, it is possible to erect very modular, stable and aesthetically pleasing construction systems together with the profiles 41, 42 and 43, in which the nodes 1 form a visually attractive termination on the corners of the skeleton structure.

What is claimed is:

1. A profile strip for use with a cube-shaped profile element, wherein the element has six identical side surfaces, in each of which there are at least two slots which are diametrically opposite each other with respect to an axis of symmetry of each side surface and adapted for insertion of interlocking elements that can be hooked behind each side surface, and wherein the profile strip is a unitary structure and includes two pairs of cross elements perpendicular to each other, wherein at least two of the cross elements each have a cavity symmetrical to a longitudinal axis of each respective cross member, with each cavity of the at least two cross elements having an interlocking element extending from a longitudinal end of each of the cross elements, wherein the interlocking element is adapted to connect with the cube-shaped profile element via the slots of the cube-shaped profile element, wherein each cross element of the profile strip includes lateral grooves and peripheral grooves.

2. The profile strip according to claim 1 further including a clamp profile for use with the profile strip, wherein the clamp profile has a center area that covers the space between two cross elements of the profile strip, and in its terminal areas makes a transition into a hook area that is engaged in lateral grooves of the cross-shaped profile strip.

3. A cube-shaped profile element with six identical side surfaces, wherein in each side surface, there are eight slots oriented at an angle of 45° to one another around the axis of symmetry of the side surface and/or a central boring, wherein each of the eight slots has a corresponding slot selected from among the eight slots that is diametrically opposite to that particular slot with respect to an axis of symmetry of the side surface and/or a central boring.

4. The profile element as claimed in claim 3, wherein the profile element is hollow and is comprised of six identical plates that form the side surfaces.

5. The profile element as claimed in claim 4, wherein each plate is octagonal with edges, whereby each edge of each plate abuts a corresponding edge on a neighboring plate, whereby the abutting edges form an opening on the corners of the cube-shaped profile element.

6. The profile element as claimed in claim 3, further including a foot for use with the profile element, wherein the foot has two overlapping octagonal plates, whereby on a lower base plate, a threaded rod is fastened, whereby the upper plate has a central boring with a female thread, so that it can be screwed onto the threaded rod, and whereby the upper plate has at least one locking hook which can be located in a predetermined slot of a cube-shaped profile element, so that by rotating the plates with respect to one another, the height of the cube-shaped element can be adjusted with respect to the base on which the base plate of the foot sits.

* * * * *